(12) United States Patent
Fujioka

(10) Patent No.: US 11,101,528 B2
(45) Date of Patent: Aug. 24, 2021

(54) LITHIUM ION SECONDARY BATTERY

(71) Applicant: Murata Manufacturing Co., Ltd., Nagaokakyo (JP)

(72) Inventor: Masato Fujioka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 70 days.

(21) Appl. No.: 16/506,184

(22) Filed: Jul. 9, 2019

(65) Prior Publication Data

US 2019/0363335 A1    Nov. 28, 2019

Related U.S. Application Data

(63) Continuation of application No. PCT/JP2017/037175, filed on Oct. 13, 2017.

(30) Foreign Application Priority Data

Mar. 14, 2017 (JP) .............. JP2017-048037

(51) Int. Cl.
| | | |
|---|---|---|
| *H01M 2/34* | (2006.01) | |
| *H01M 10/0525* | (2010.01) | |
| *H01M 4/587* | (2010.01) | |
| *H01M 4/525* | (2010.01) | |
| *H01M 4/66* | (2006.01) | |
| *H01M 50/581* | (2021.01) | |

(52) U.S. Cl.
CPC ......... *H01M 50/581* (2021.01); *H01M 4/525* (2013.01); *H01M 4/587* (2013.01); *H01M 4/667* (2013.01); *H01M 10/0525* (2013.01); *H01M 2200/106* (2013.01)

(58) Field of Classification Search
CPC ....... H01M 2/348; H01M 4/525; H01M 4/587
USPC ........................................................ 429/61
See application file for complete search history.

(56) References Cited

U.S. PATENT DOCUMENTS

| | | | |
|---|---|---|---|
| 6,159,635 A | 12/2000 | Dasgupta et al. | |
| 2008/0241684 A1* | 10/2008 | Muraoka | H01M 4/667 429/209 |
| 2013/0157129 A1 | 6/2013 | Uemura | |
| 2013/0164614 A1 | 6/2013 | Uemura | |

(Continued)

FOREIGN PATENT DOCUMENTS

| | | |
|---|---|---|
| JP | 2000294230 A | 10/2000 |
| JP | 2002526897 A | 8/2002 |

(Continued)

OTHER PUBLICATIONS

International Search Report issued for PCT/JP2017/037175, dated Dec. 26, 2017.

*Primary Examiner* — Jayne L Mershon
(74) *Attorney, Agent, or Firm* — Arent Fox LLP

(57) ABSTRACT

A lithium ion secondary battery that includes a positive electrode, a negative electrode, a separator, a nonaqueous electrolytic solution, and a PTC layer between a positive electrode mixture layer and a positive electrode current collector and/or between a negative electrode mixture layer and a negative electrode current collector, the PTC layer having a positive temperature coefficient of resistance. The PTC layer contains nonconductive filler particles, and the electronic resistance at 120° C. is equal to or more than 100 times the electronic resistance at room temperature.

13 Claims, 3 Drawing Sheets

(56) References Cited

U.S. PATENT DOCUMENTS

| | | | |
|---|---|---|---|
| 2015/0255786 A1* | 9/2015 | Hashimoto | H01M 4/366 |
| | | | 429/233 |
| 2015/0294802 A1* | 10/2015 | Kato | H01M 4/13 |
| | | | 361/502 |
| 2015/0303484 A1 | 10/2015 | Iida | |
| 2018/0026301 A1* | 1/2018 | Ebisuzaki | H01M 10/0481 |
| | | | 429/245 |

FOREIGN PATENT DOCUMENTS

| | | | |
|---|---|---|---|
| JP | 2008243708 A | 10/2008 | |
| JP | 2009176599 A | 8/2009 | |
| JP | 2012094403 A | 5/2012 | |
| WO | 2012029858 A1 | 3/2012 | |
| WO | 2014077384 A1 | 5/2014 | |

\* cited by examiner

LITHIUM ION SECONDARY BATTERY

CROSS REFERENCE TO RELATED APPLICATIONS

The present application is a continuation of International application No. PCT/JP2017/037175, filed Oct. 13, 2017, which claims priority to Japanese Patent Application No. 2017-048037, filed Mar. 14, 2017, the entire contents of each of which are incorporated herein by reference.

FIELD OF THE INVENTION

The present invention relates to a lithium ion secondary battery.

BACKGROUND OF THE INVENTION

The internal temperature of the lithium ion secondary battery rises during overcharge or the like, which may cause a problem. Thus, Patent Documents 1 and 2 each describe a lithium ion secondary battery in which a positive temperature coefficient (PTC) layer having a positive temperature coefficient of resistance is provided between a current collector of an electrode and an active material layer. The lithium ion secondary battery is configured such that, when the temperature rises, the resistance of the PTC layer increases and the current is blocked, thereby securing safety at high temperatures.

Patent Document 1: Japanese Patent Application Laid-Open No. 2009-176599
Patent Document 2: Japanese Patent Application Laid-Open No. 2008-243708

SUMMARY OF THE INVENTION

Here, the reason why the resistance of a PTC layer increases with increasing temperature is because when the temperature rises, the crystallinity of a crystalline polymer in the PTC layer decreases, the volume expands, and the conductive network is thereby cut.

However, since the crystalline polymer has fluidity in a high temperature region where volume expansion occurs, the conductive network cut by the flowing crystalline polymer is recovered depending on the stress conditions inside the battery, and the current blocking function of the PTC layer may therefore be reduced.

An object of the present invention is to solve the above problems, and to provide a lithium ion secondary battery capable of maintaining high safety even when the temperature rises.

The lithium ion secondary battery of the present invention includes: a positive electrode having a positive electrode current collector and a positive electrode mixture layer which contains a positive electrode active material; a negative electrode having a negative electrode current collector and a negative electrode mixture layer which contains a negative electrode active material; a separator located between the positive electrode and the negative electrode; a nonaqueous electrolytic solution; and a PTC layer which is provided at least either between the positive electrode mixture layer and the positive electrode current collector or between the negative electrode mixture layer and the negative electrode current collector, the PTC layer having a positive temperature coefficient of resistance. The PTC layer contains nonconductive filler particles, and the electronic resistance at 120° C. is equal to or more than 100 times the electronic resistance at room temperature. Also, in an arbitrary cross-section crossing the PTC layer, a relationship of $0.7 \, t \leq D50\_f$ exists between a median diameter $D50\_f$ of a circle equivalent diameter obtained from a cross-sectional area of each of the filler particles and a thickness t of the PTC layer, and a relationship of $h \leq D50\_k$ exists between an average value h of heights of portions where the filler particles protrude from a surface of the PTC layer, and a volume-based median diameter $D50\_k$ of pores in at least one of the positive electrode mixture layer and the negative electrode mixture layer in contact with the PTC layer.

The nonconductive filler particles may be insulating ceramic particles.

The PTC layer may contain a highly crystalline polyethylene emulsion resin.

In the lithium ion secondary battery according to the present invention, the PTC layer functions as an insulating layer for blocking the current when the temperature rises to a high temperature, and this results in securing safety at high temperatures. Further, since nonconductive filler particles are contained in the PTC layer, it is possible to suppress the recovery of the cut conductive network due to the softening and flowing of polymer molecules in the PTC layer at high temperatures. Thus, it is possible to maintain safety of the lithium ion secondary battery at high temperatures.

In particular, because the relationship of $0.7 \, t \leq D50\_f$ exists between the median diameter $D50\_f$ of each of the nonconductive filler particles in the PTC layer and the thickness t of the PTC layer, the filler particles function as a spacer even when polymer molecules are softened and flowed at high temperature, and it is possible to suppress the recovery of the cut conductive network.

Further, because the relationship of $h \leq D50\_k$ exists between the average value h of the heights of the portions where the nonconductive filler particles protrude from the surface of the PTC layer and the volume-based median diameter $D50\_k$ of the pores in the mixture layer in contact with the PTC layer, the protruding portions of the filler particles fit in the pores of the mixture layer even when the nonconductive filler particles protrude from the surface of the PTC layer. Accordingly, the contact failure between the mixture layer and the PTC layer can be suppressed, and the cycle characteristics of the lithium ion secondary battery can be improved.

DETAILED DESCRIPTION OF THE INVENTION

More specifically, the characteristics of the present invention will be hereinafter described with reference to embodiments of the present invention.

Hereinafter, a lithium ion secondary battery having a structure in which a stacked body formed by alternately stacking a plurality of positive electrodes and a plurality of negative electrodes with a separator interposed therebetween and a nonaqueous electrolytic solution are housed in an exterior body will be described as an example.

First Embodiment

Figure 1:
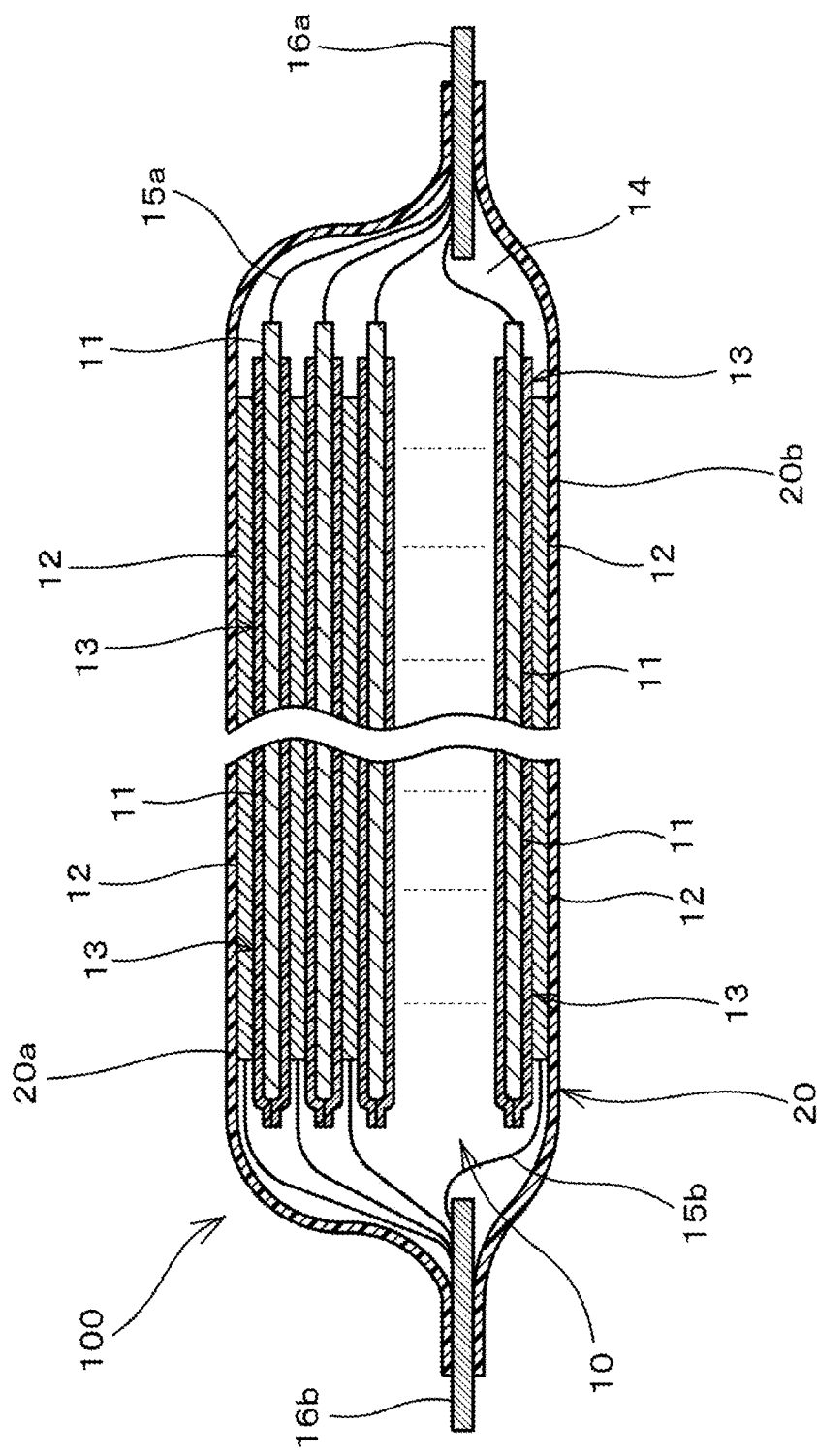
FIG. 1 is a cross-sectional view of a lithium ion secondary battery according to a first embodiment of the present invention.

FIG. 1 is a cross-sectional view of a lithium ion secondary battery 100 according to the first embodiment of the present invention. The lithium ion secondary battery 100 has a structure in which a stacked body 10 formed by alternately stacking a plurality of positive electrodes 11 and a plurality of negative electrodes 12 with a separator 13 interposed therebetween and a nonaqueous electrolytic solution 14 are housed in a laminate case 20.

The laminate case 20, which is an exterior body, is formed by joining the peripheral portions of a pair of laminate films 20a and 20b by thermal compression bonding.

A positive electrode terminal 16a is led to the outside from one end side of the laminate case 20 and a negative electrode terminal 16b is led to the outside from the other end side. The plurality of positive electrodes 11 is connected to the positive electrode terminal 16a through lead wires 15a. Further, the plurality of negative electrodes 12 is connected to the negative electrode terminal 16b through lead wires 15b.

Figure 2:
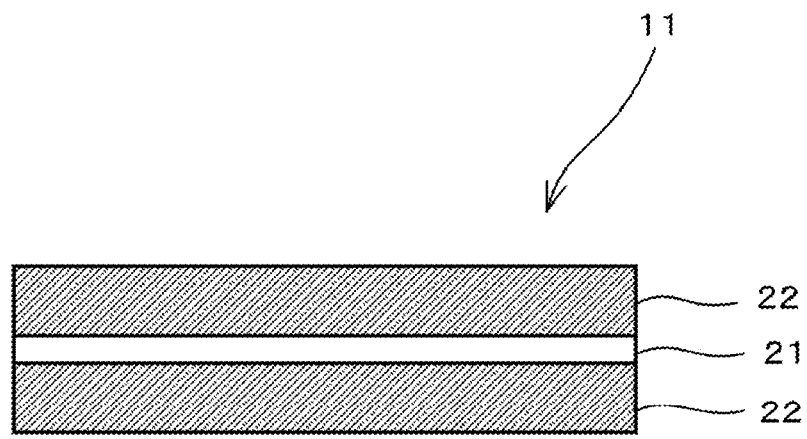
FIG. 2 is a cross-sectional view illustrating a configuration of a positive electrode used in the lithium ion secondary battery in the first embodiment.

As illustrated in FIG. 2, the positive electrode 11 includes a positive electrode current collector 21 and positive electrode mixture layers 22 formed on both surfaces of the positive electrode current collector 21. As the positive electrode current collector 21, for example, a metal foil such as aluminum may be used. The positive electrode mixture layer 22 contains a positive electrode active material and may further contain a binder and a conductive auxiliary agent. For example, lithium cobaltate may be used as the positive electrode active material.

Figure 3:
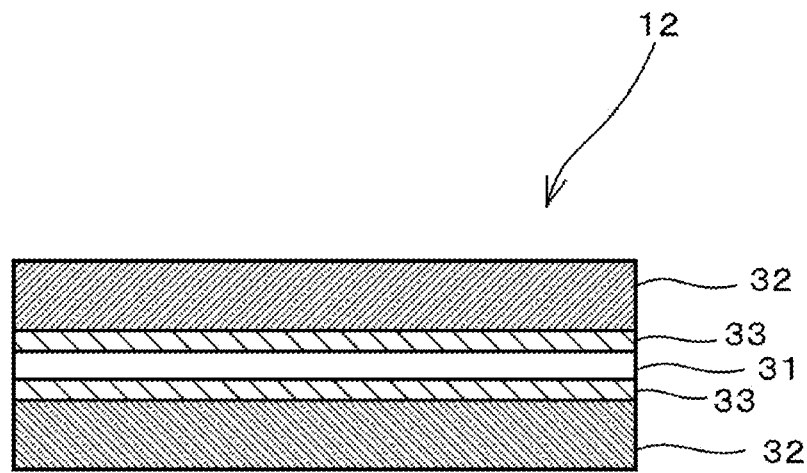
FIG. 3 is a cross-sectional view illustrating a configuration of a negative electrode used in the lithium ion secondary battery in the first embodiment.

As illustrated in FIG. 3, the negative electrode 12 includes a negative electrode current collector 31, negative electrode mixture layers 32, and PTC layers 33. As for the negative electrode current collector 31, a metal foil such as copper may be used. The negative electrode mixture layer 32 contains a negative electrode active material and may further contain a binder and a conductive auxiliary agent. For example, artificial graphite may be used as the negative electrode active material.

The PTC layer 33 is provided between the negative electrode current collector 31 and the negative electrode mixture layer 32, and contains, for example, a polymer, conductive particles, and nonconductive filler particles. The PTC layer 33 has a positive temperature coefficient of resistance, and the resistance increases as the temperature rises. The electronic resistance of the PTC layer 33 at 120° C. is equal to or more than 100 times the electronic resistance at room temperature (25° C.). In other words, the PTC layer 33 functions as a conductive layer at room temperature because it has electron conductivity, and functions as an insulating layer at least in a temperature range of 120° C. or more.

An example of a nonconductive filler that can be used in PTC layer 33 is alumina. However, the nonconductive filler is not limited to alumina, and an insulating ceramic such as silica, titania or zirconia may be used.

In an arbitrary cross-section crossing the PTC layer 33, the relationship of 0.7 t≤D50_f exists between the median diameter D50 of the circle equivalent diameter obtained from the cross-sectional area of each of the nonconductive filler particles in the PTC layer 33 (hereinafter, the median diameter D50 is referred to as "D50_f") and the thickness t of the PTC layer 33. The thickness t of the PTC layer 33 is, for example, 1 μm.

Further, the relationship of h≤D50_k exists between the average value h of the heights of the portions where the nonconductive filler particles protrude from the surface of the PTC layer 33 and the volume-based median diameter D50 of the pores (voids) in the negative electrode mixture layer 32 in contact with the PTC layer 33 (hereinafter, the volume-based median diameter D50 of the pores in the mixture layer is referred to as "D50_k").

The separator 13 is interposed between the positive electrode 11 and the negative electrode 12. As the separator 13, various separators usable for the lithium ion secondary battery can be used without particular limitation. Although the separator 13 illustrated in FIG. 1 has a bag shape, it may have a sheet shape or may have a zigzag folded shape.

The nonaqueous electrolytic solution 14 may be any nonaqueous electrolytic solution as long as it can be used for the lithium ion secondary battery.

In the lithium ion secondary battery 100 according to the first embodiment, the PTC layer 33 is provided between the negative electrode current collector 31 and the negative electrode mixture layer 32, whereby the PTC layer 33 functions as an insulating layer for blocking the current when the temperature rises to a high temperature, and this results in securing the safety at high temperatures.

Further, since the PTC layer 33 contains nonconductive filler particles, it is possible to suppress the recovery of the cut conductive network due to the softening and flowing of the crystalline polymer in the PTC layer 33 under high temperature. Thus, it is possible to maintain the safety of the lithium ion secondary battery 100 at high temperature.

In particular, in an arbitrary cross-section crossing the PTC layer 33, the relationship of 0.7 t≤D50_f exists between the median diameter D50_f of the circle equivalent diameter obtained from the cross-sectional area of each of the nonconductive filler particles in the PTC layer 33 and the thickness t of the PTC layer 33, whereby the filler particles function as a spacer even when the crystalline polymer is softened and flowed at high temperature, thereby making it possible to suppress the recovery of the cut conductive network.

The lithium ion secondary battery 100 according to this embodiment is configured as described above, so that it is possible to maintain the safety at high temperatures, even when the thickness t of the PTC layer 33 is, for example, as thin as 1 μm. In other words, it is possible to reduce the thickness t of the PTC layer 33 in order to maintain the safety at high temperatures, so that it is possible to suppress the deterioration of the characteristics of the lithium ion secondary battery 100 due to an increase of the thickness t of the PTC layer 33.

Further, in the lithium ion secondary battery 100 according to this embodiment, the relationship of h≤D50_k exists between the average value h of the heights of the portions where the nonconductive filler particles protrude from the surface of the PTC layer 33 and the volume-based median diameter D50_k of the pores in the negative electrode mixture layer 32 in contact with the PTC layer 33, whereby the protruding portions of the filler particles fit in the pores of the negative electrode mixture layer 32, even when the nonconductive filler particles protrude from the surface of the PTC layer 33. Accordingly, the contact failure between the negative electrode mixture layer 32 and the PTC layer 33 can be suppressed, and the cycle characteristics of the lithium ion secondary battery 100 can be improved.

Second Embodiment

In the lithium ion secondary battery 100 according to the first embodiment, the PTC layer 33 is provided between the negative electrode current collector 31 and the negative electrode mixture layer 32. Meanwhile, in the lithium ion secondary battery 100 according to the second embodiment, the PTC layer is provided between the positive electrode current collector 21 and the positive electrode mixture layer 22.

Figure 4:
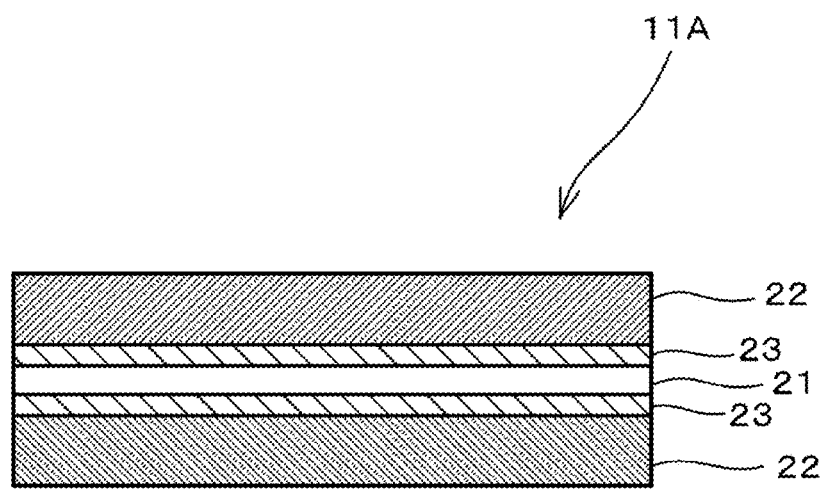
FIG. 4 is a cross-sectional view illustrating a configuration of a positive electrode used in a lithium ion secondary battery in a second embodiment.

FIG. 4 is a cross-sectional view illustrating a configuration of a positive electrode 11A used in the lithium ion secondary battery 100 in the second embodiment. As illustrated in FIG. 4, the positive electrode 11A includes the positive electrode current collector 21, the positive electrode mixture layers 22, and the PTC layers 23. The PTC layer 23 is provided between the positive electrode current collector 21 and the positive electrode mixture layer 22.

The structure and function of the PTC layer 23 are the same as the structure and function of the PTC layer 33 in the first embodiment. That is, the PTC layer 23 contains non-conductive filler particles, and the electronic resistance at 120° C. is equal to or more than 100 times the electronic resistance at room temperature. Further, in an arbitrary cross-section crossing the PTC layer 23, the relationship of $0.7 \; t \leq D50\_f$ exists between the median diameter $D50\_f$ of the circle equivalent diameter obtained from the cross-sectional area of each of the filler particles and the thickness t of the PTC layer 23. Furthermore, the relationship of $h \leq D50\_k$ exists between the average value h of the heights of the portions where the filler particles protrude from the surface of the PTC layer 23, and the volume-based median diameter $D50\_k$ of the pores in the positive electrode mixture layer 22 in contact with the PTC layer 23.

Figure 5:
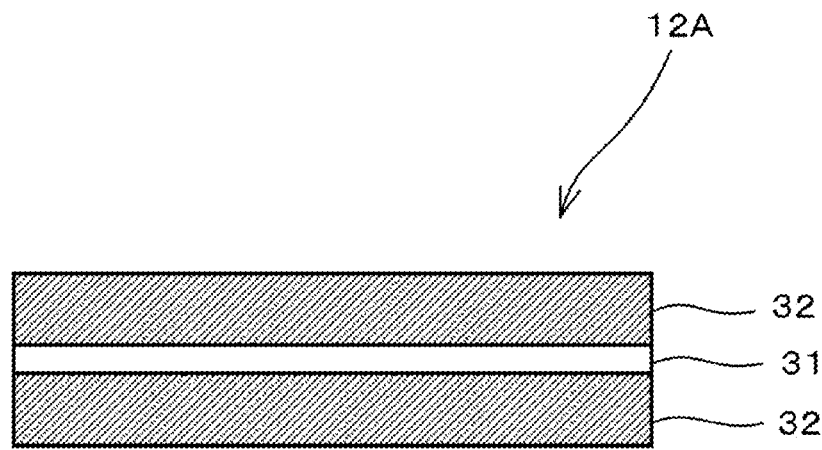
FIG. 5 is a cross-sectional view illustrating a configuration of a negative electrode used in the lithium ion secondary battery in the second embodiment.

Meanwhile, as illustrated in FIG. 5, the PTC layer 33 described in the first embodiment is not provided in the negative electrode 12A used in the lithium ion secondary battery 100 in the second embodiment. That is, the negative electrode 12A has the negative electrode current collector 31 and the negative electrode mixture layers 32 formed on both surfaces of the negative electrode current collector 31.

Also, in the lithium ion secondary battery 100 according to the second embodiment, the safety at high temperature can be maintained and high cycle characteristics can be obtained, similarly to the lithium ion secondary battery 100 according to the first embodiment.

EXAMPLES

[Positive Electrode]

Lithium cobaltate (LCO) was provided as a positive electrode active material, acetylene black was provided as a conductive auxiliary agent, and polyvinylidene fluoride (PVdF) was provided as a binder. These materials were dispersed in N-methyl-2-pyrrolidone (NMP) so that the weight ratio of LCO:acetylene black:PVdF was 96:2:2, thereby producing a positive electrode mixture layer slurry. Then, the produced positive electrode mixture layer slurry was applied to both surfaces of an aluminum foil using a die coater so that the basis weight was 20.0 mg/cm$^2$, the resulting layer was dried and compressed so as to have a void rate of 17% using a roll press machine, and the resultant was cut into a predetermined shape to produce a positive electrode including no PTC layer.

[Negative Electrode]

Artificial graphite was provided as a negative electrode active material, and carboxymethylcellulose sodium (CMC) and styrene-butadiene rubber (SBR) were provided as binders. These materials were dispersed in water so that the weight ratio of artificial graphite:CMC:SBR was 96:2:2, thereby producing a negative electrode mixture layer slurry.

Then, the produced negative electrode slurry was applied to both surfaces of a copper foil using a die coater so that the basis weight was 10.5 mg/cm$^2$, the resulting layer was dried and compressed so as to have a void rate of 25% using a roll press machine, and the resultant was cut into a predetermined shape to produce a negative electrode including no PTC layer.

Further, six types of negative electrodes including a PTC layer were produced.

First, an aqueous dispersion containing a low crystalline polyethylene emulsion resin (low crystalline PE) and an aqueous dispersion containing a highly crystalline polyethylene emulsion resin (high crystalline PE) were provided in order to form PTC layers respectively included in the six types of negative electrodes. Then, acetylene black as a conductive material and alumina as a nonconductive filler were mixed with and dispersed in the provided aqueous dispersions so that the volume ratio of polyethylene emulsion resin:acetylene black:alumina was 8:1:1, thereby producing a PTC layer slurry. Alumina having an average particle size of 0.4 μm, alumina having an average particle size of 0.9 μm, and alumina having an average particle size of 1.8 μm were provided.

Thereafter, the PTC layer slurry was applied to both surfaces of a copper foil so that the thickness after drying was 1 μm and the resulting layer was dried to form a PTC layer.

Then, the negative electrode mixture layer slurry was applied to the surface of the formed PTC layer by the method described above. Thereafter, six types of negative electrodes including the PTC layer, i.e., negative electrodes constituting cells of Sample Nos. 2 to 7 in Table (described later), were produced by the same production step as the negative electrode including no PTC layer.

A plurality of positive electrodes and a plurality of negative electrodes which were produced by the above method were alternately stacked with separators interposed therebetween. All the positive electrodes were bundled and welded to positive electrode tabs, all the negative electrodes were bundled and welded to negative electrode tabs, and the welded electrodes were then placed in an aluminum laminate cup. Next, an organic electrolytic solution was obtained by dissolving 1 mol of lithium hexafluorophosphate (LiPF$_6$) in 1 liter of a solvent obtained by mixing ethylene carbonate (EC) and ethyl methyl carbonate (EMC) at a volume ratio of 25:75, and the electrolytic solution was injected into the aluminum laminate cup.

Thereafter, the aluminum laminate cup was temporarily vacuum-sealed, and then charged and discharged at 0.2 CA. A gas generated by the charge and discharge processes was released out of the aluminum laminate cup, and then the aluminum laminate cup was fully vacuum-sealed, thereby producing cells having a capacity of 2 Ah. Then, the produced cells were charged to a SOC of 70% and subjected to an aging process at 55° C. for 24 hours, thereby producing cells of Sample Nos. 1 to 7 shown in Table 1.

TABLE 1

| Sample No. | Type of polymer in the PTC layer | Electronic resistance of the PTC layer at 25° C. ($\Omega/cm^2$) | Electronic resistance of the PTC layer at 120° C. ($\Omega/cm^2$) | Electronic resistance at 120° C./ electronic resistance at 25° C. | Presence or absence of the content of filler particles | Requirement of the relationship of $0.7\ t \leq D50\_f$ | Presence or absence of the protrusion of filler particles | Requirement of the relationship of $h \leq D50\_k$ | Presence or absence of smoke and ignition in nail piercing test | Capacity retention rate after cycle (%) |
|---|---|---|---|---|---|---|---|---|---|---|
| *1 | — | — | — | — | — | — | — | — | Presence of ignition | 88 |
| *2 | Highly crystalline PE | 0.23 | 25.1 | 109.1 | Absence | — | — | — | Presence of smoke | 86 |
| *3 | Low crystalline PE | 0.20 | 1.8 | 9.0 | Presence | ○ $0.7\ t = 0.7$ $D50\_f = 0.9$ | Absence | — | Presence of ignition | 85 |
| *4 | Highly crystalline PE | 0.23 | 25.1 | 109.1 | Presence | X $0.7\ t = 0.7$ $D50\_f = 0.4$ | Absence | — | Presence of smoke | 89 |
| 5 | Highly crystalline PE | 0.23 | 25.1 | 109.1 | Presence | ○ $0.7\ t = 0.7$ $D50\_f = 0.9$ | Absence | — | Absence | 86 |
| 6 | Highly crystalline PE | 0.23 | 25.1 | 109.1 | Presence | ○ $0.7\ t = 0.7$ $D50\_f = 1.8$ | Presence | ○ $h = 0.8$ $D50\_k = 1.0$ | Absence | 88 |
| *7 | Highly crystalline PE | 0.23 | 25.1 | 109.1 | Presence | ○ $0.7\ t = 0.7$ $D50\_f = 1.8$ | Presence | X $h = 0.8$ $D50\_k = 0.6$ | Absence | 45 |

The cell of Sample No. 1 is a cell produced using the negative electrode including no PTC layer.

The cell of Sample No. 2 is a cell in which a highly crystalline polyethylene emulsion resin is used as a polymer contained in the PTC layer, and nonconductive filler particles are not contained in the PTC layer. The volume ratio of the polyethylene emulsion resin to acetylene black at the time of producing the PTC layer slurry was 9:1.

The cell of Sample No. 3 is a cell in which a low crystalline polyethylene emulsion resin is used as a polymer contained in the PTC layer, and nonconductive filler particles are contained in the PTC layer. In the cell of Sample No. 3, the ratio of the electronic resistance at 120° C. to the electronic resistance at 25° C. is 9.0.

The cell of sample No. 4 is a cell in which a highly crystalline polyethylene emulsion resin is used as a polymer contained in the PTC layer, and nonconductive filler particles having a median diameter D50_f of 0.4 μm are contained in the PTC layer.

The cell of sample No. 5 is a cell in which a highly crystalline polyethylene emulsion resin is used as a polymer contained in the PTC layer, and nonconductive filler particles having a median diameter D50_f of 0.9 μm are contained in the PTC layer. The nonconductive filler particles in the PTC layer do not protrude from the surface of the PTC layer.

The cell of sample No. 6 is a cell in which a highly crystalline polyethylene emulsion resin is used as a polymer contained in the PTC layer, and nonconductive filler particles having a median diameter D50_f of 1.8 μm are contained in the PTC layer. The nonconductive filler particles protrude from the surface of the PTC layer, and the average value h of the heights of the protruding portions is 0.8 μm. Further, the volume-based median diameter D50_k of the pores in the negative electrode mixture layer in contact with the PTC layer is 1.0 μm.

The cell of sample No. 7 is a cell in which a highly crystalline polyethylene emulsion resin is used as a polymer in the PTC layer, and nonconductive filler particles having a median diameter D50_f of 1.8 μm are contained in the PTC layer. The nonconductive filler particles protrude from the surface of the PTC layer, and the average value h of the heights of the protruding portions is 0.8 μm. Further, the volume-based median diameter D50_k of the pores in the negative electrode mixture layer in contact with the PTC layer is 0.6 μm.

The cells of Sample Nos. 5 and 6 are cells which satisfy the requirements of the present invention, i.e., all the following requirements (a) to (d):

(a) the PTC layer having a positive temperature coefficient of resistance is provided at least either between the positive electrode mixture layer and the positive electrode current collector or between the negative electrode mixture layer and the negative electrode current collector;

(b) the PTC layer contains nonconductive filler particles, and the electronic resistance at 120° C. is equal to or more than 100 times the electronic resistance at room temperature;

(c) in an arbitrary cross-section crossing the PTC layer, the relationship of $0.7\ t \leq D50\_f$ exists between the median diameter D50_f of the circle equivalent diameter obtained from the cross-sectional area of each of the filler particles and the thickness t of the PTC layer; and (d) the relationship of $h \leq D50\_k$ exists between the average value h of the heights of the portions where the filler particles protrude from the surface of the PTC layer, and the volume-based median diameter D50_k of the pores in the mixture layers in contact with the PTC layer.

Meanwhile, in Table 1, cells whose sample numbers are marked with * (i.e., the cells of Sample Nos. 1 to 4 and 7) do not satisfy the requirements of the present invention, namely, the cells do not satisfy at least one of the requirements (a) to (d).

[Electronic Resistance of PTC Layer]

Regarding each of the cells of Sample Nos. 1 to 7, the PTC layer was sandwiched between two terminals of an AC resistance meter, and the AC resistance per unit area (Ω/cm$^2$), measured at a frequency of 1 kHz, was defined as the electronic resistance of the PTC layer. The electron resistance at room temperature (25° C.) and the electronic resistance at 120° C. were respectively determined, and the ratio of the electron resistance at 120° C. to the electron resistance at 25° C. was determined.

[Measurement of Thickness t of PTC Layer]

The average thickness t of the PTC layer was determined by ion milling the PTC layer for each of the cells of Sample Nos. 1 to 7 to cut out the cross-section, observing the cross-section with a scanning electron microscope (SEM), and analyzing the observed image. In this example, the average thickness t of the PTC layer of each of the cells of Sample Nos. 1 to 7 was 1 μm.

[Measurement of Median Diameter D50_f of Each of Nonconductive Filler Particles in PTC Layer]

The median diameter D50_f of the circle equivalent diameter was determined by ion milling the PTC layer for each of the cells of Sample Nos. 1 to 7 to cut out the cross-section, observing the cross-section with a scanning electron microscope (SEM), analyzing the observed image, and finding the cross-sectional area of each of the nonconductive filler particles.

[Measurement of Average Value h of Heights of Portions Where Filler Particles Protruding from Surface of PTC Layer]

The average value h of the heights of the portions of the particles protruding from the surface of the PTC layer was determined by ion milling the PTC layer for each of the cells of Sample Nos. 1 to 7 to cut out the cross-section, observing the cross-section with a scanning electron microscope (SEM), analyzing the observed image, and finding the cross-sectional area of each of the nonconductive filler particles. When the nonconductive filler particles do not protrude from the surface of the PTC layer, the average value h is zero.

[Measurement of Volume-Based Median Diameter D50_k of Pores in Negative Electrode Mixture Layer in Contact with PTC Layer]

The volume-based median diameter D50_k of the pores in the negative electrode mixture layer formed on the surface of the PTC layer was determined using a mercury porosimeter.

[Presence or Absence of Smoke and Ignition in Nail Piercing Test]

A nail was pierced in each of the cells of Sample Nos. 1 to 7, and the presence or absence of smoke and ignition was confirmed. The used nail was made of stainless steel having a diameter of 2.5 mm. The nailing speed was 100 mm/sec, and the environmental temperature was 20° C.

[Capacity Retention Rate after Cycle]

The cells of Sample Nos. 1 to 7 were subjected to 200 cycles of full charge and discharge under conditions (temperature: 45° C., current: 0.7 CA, and voltage range: 3.00 V to 4.35 V), and the charge capacity at the 200th cycle to the charge capacity at the first cycle was determined as the capacity retention rate after the cycle.

The cells of Sample Nos. 5 and 6 satisfying the requirements of the present invention did not ignite or smoke in the nail piercing test. Further, the capacity retention rate after the cycle was 86% or more.

That is, the cells of Sample Nos. 5 and 6 satisfying the requirements of the present invention achieve high safety at high temperature and high cycle capacity retention rate.

Meanwhile, the cells of Sample Nos. 1 to 4 are cells which do not satisfy the requirements of the present invention. Specifically, among the requirements (a) to (d), at least one of the requirements (a) to (c) is not satisfied. The cells of Sample Nos. 1 to 4 unsatisfying the requirements of the present invention ignited or smoked in the nail piercing test.

The cell of Sample No. 7 is a cell which does not satisfy the requirement (d) among the requirements (a) to (d) of the present invention. The cell of Sample No. 7 unsatisfying the requirements of the present invention did not ignite or smoke in the nail piercing test, and the capacity retention rate after cycle was 45%. This is because, since the requirement (d) is not satisfied, the protruding portions of the nonconductive filler particles from the surface of the PTC layer do not fit in the pores of the negative electrode mixture layer, thereby causing a contact failure between the negative electrode mixture layer and the PTC layer.

The present invention is not limited to the above embodiments, and various applications and modifications can be added within the scope of the present invention.

For example, the embodiments have been described such that the PTC layer is provided either between the positive electrode mixture layer and the positive electrode current collector or between the negative electrode mixture layer and the negative electrode current collector. However, the PTC layer may be provided both between the positive electrode mixture layer and the positive electrode current collector and between the negative electrode mixture layer and the negative electrode current collector.

In the embodiments, a lithium ion secondary battery having a structure in which a stacked body formed by alternately stacking a plurality of positive electrodes and a plurality of negative electrodes with a separator interposed therebetween and a nonaqueous electrolytic solution are housed in an exterior body has been described as an example. However, the structure of the lithium ion secondary battery according to the present invention is not limited to the above structure. For example, the lithium ion secondary battery may have a structure in which a wound body formed by winding a positive electrode and a negative electrode stacked with a separator interposed therebetween and a nonaqueous electrolytic solution are housed in an exterior body. Further, the exterior body may be not a laminate case, but rather a metal can.

DESCRIPTION OF REFERENCE SYMBOLS

10: Stacked body
11: Positive electrode of the first embodiment
11A: Positive electrode of the second embodiment
12: Negative electrode of the first embodiment
12A: Negative electrode of the second embodiment
13: Separator
14: Nonaqueous electrolytic solution
20: Laminate case
21: Positive electrode current collector
22: Positive electrode mixture layer
23: PTC layer
31: Negative electrode current collector
32: Negative electrode mixture layer
33: PTC layer
100: Lithium ion secondary battery

The invention claimed is:

1. A lithium ion secondary battery comprising:
a positive electrode having a positive electrode current collector and a positive electrode mixture layer which contains a positive electrode active material;
a negative electrode having a negative electrode current collector and a negative electrode mixture layer which contains a negative electrode active material;

a separator between the positive electrode and the negative electrode;

a nonaqueous electrolytic solution;

a positive temperature coefficient (PCT) layer between the positive electrode mixture layer and the positive electrode current collector and/or between the negative electrode mixture layer and the negative electrode current collector, the PTC layer having a positive temperature coefficient of resistance, wherein the PTC layer contains nonconductive filler particles, and an electronic resistance at 120° C. is equal to or more than 100 times an electronic resistance at room temperature, in an arbitrary cross section crossing the PTC layer, a relationship of $0.7\ t \leq D50\_f$ exists, where $D50\_f$ is a median diameter of a circle equivalent diameter obtained from a cross-sectional area of each of the filler particles and t is a thickness of the PTC layer, and a relationship of $h \leq D50\_k$ exists, where h is an average value of heights of portions where the filler particles protrude from a surface of the PTC layer, and $D50\_k$ is a volume-based median diameter of pores in at least one of the positive electrode mixture layer and the negative electrode mixture layer in contact with the PTC layer.

2. The lithium ion secondary battery according to claim 1, wherein the nonconductive filler particles are insulating ceramic particles.

3. The lithium ion secondary battery according to claim 2, wherein the insulating ceramic particles are selected from alumina, silica, titania, and zirconia.

4. The lithium ion secondary battery according to claim 1, wherein the positive electrode active material is lithium cobaltate.

5. The lithium ion secondary battery according to claim 1, wherein the negative electrode active material is artificial graphite.

6. The lithium ion secondary battery according to claim 1, wherein the PTC layer contains a crystalline polymer.

7. The lithium ion secondary battery according to claim 6, wherein the crystalline polymer is a crystalline polyethylene emulsion resin.

8. The lithium ion secondary battery according to claim 6, wherein the PTC layer further includes a conductive material.

9. The lithium ion secondary battery according to claim 8, wherein the conductive material is acetylene black.

10. The lithium ion secondary battery according to claim 1, wherein the PTC layer is between the positive electrode mixture layer and the positive electrode current collector.

11. The lithium ion secondary battery according to claim 1, wherein the PTC layer is between the negative electrode mixture layer and the negative electrode current collector.

12. The lithium ion secondary battery according to claim 1, wherein the PTC layer is a first PTC layer between the positive electrode mixture layer and the positive electrode current collector, and the lithium ion secondary battery further includes a second PTC layer between the negative electrode mixture layer and the negative electrode current collector.

13. The lithium ion secondary battery according to claim 1, wherein the thickness t of the PTC layer is 1 μm.

* * * * *